(No Model.)

M. E. BEASLEY.
PROCESS OF NOTCHING AND CUTTING HOOPS FOR BARRELS.

No. 448,905. Patented Mar. 24, 1891.

Witnesses:
Alex. Darkoff
Murray C. Boyer

Inventor:
Maria E. Beasley
by her Attorneys
Howson & Howson

UNITED STATES PATENT OFFICE.

MARIA E. BEASLEY, OF PHILADELPHIA, PENNSYLVANIA.

PROCESS OF NOTCHING AND CUTTING HOOPS FOR BARRELS

SPECIFICATION forming part of Letters Patent No. 448,905, dated March 24, 1891.

Application filed February 8, 1890. Serial No. 339,706. (No model.)

*To all whom it may concern:*

Be it known that I, MARIA E. BEASLEY, a citizen of the United States, and a resident of Philadelphia, Pennsylvania, have invented an Improved Process of Notching and Cutting Hoops for Barrels, of which the following is a specification.

The object of my invention is to cut and notch a series of barrel-hoops simultaneously, whereby a full set of hoops for one end of a barrel is prepared, ready and in order for the cooper to place in position on the barrel.

Figure 1:
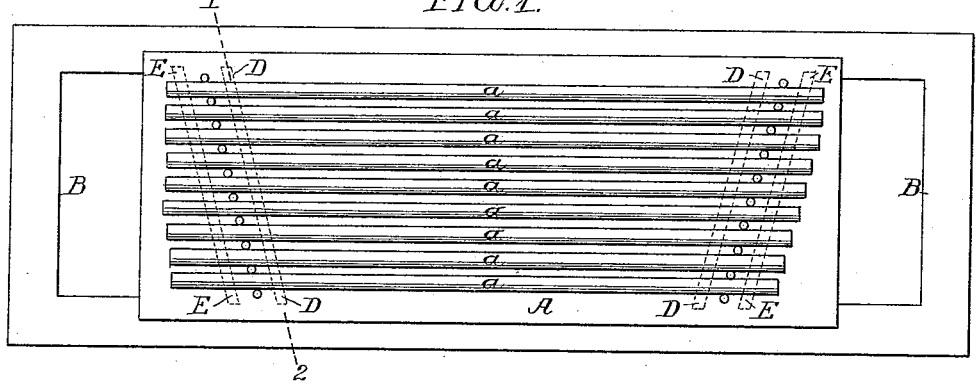
Figure 2:
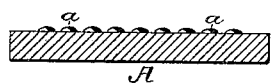
Figure 3:
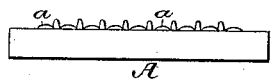
Figure 4:
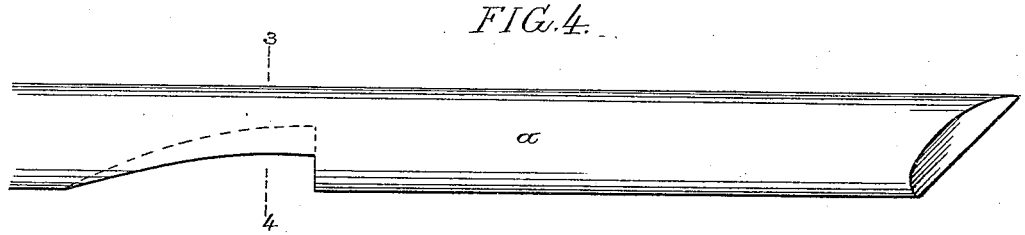
Figure 6:
Figure 5:
Figure 7:
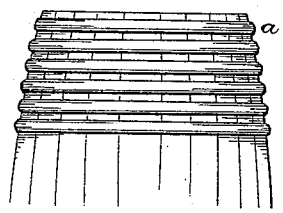

In the accompanying drawings, Figure 1 is a plan view of the cutting-table, showing the hoops in position, the knives being shown by dotted lines. Fig. 2 is a section on the line 1 2, Fig. 1. Fig. 3 is an end view. Fig. 4 is an enlarged plan view of one end of a hoop. Fig. 5 is a section on the line 3 4, Fig. 4. Fig. 6 is a side view of one of the hoops, and Fig. 7 is a view of a hooped barrel.

My process of cutting hoops is carried out mainly in preparing hoops for pork and fish barrels. These barrels have a number of hoops upon each end, generally arranged side by side. These hoops have heretofore been notched by hand and when they are undercut, as shown in Fig. 5, it is very tedious work and also expensive, the hoops being cut and notched singly; but by my process the series of hoops for each end are cut with one stroke, and the hoops after cutting are in regular order to be placed by the cooper upon the barrel.

In carrying out my process a machine may be used constructed in accordance with the drawings and description set forth in an application for patent for hoop-cutting machine by Beasley and Allen, Serial No. 364,639.

Referring to Fig. 1 of the drawings, A is the cutting-table, mounted upon a suitable bed B. On this table are placed the hoop-blanks *a* to be cut. Clamps may be used to hold the several hoops in position, if required, and spacing-pins may be used, as clearly shown in Fig. 1.

The cutting-knives D for notching the hoops are shown by dotted lines and are inclined to the bilge of the barrel. The cutting-off knives E are at a similar incline, so that the hoops intended for the bilge will be longer than the ones intended for the end of the barrel. I prefer to cut the hoops at an incline, so as to form an undercut notch and sever the hoop at an angle, so that when the ends are clinched together they will be secure and have a neat appearance. By altering the angle of the knife-bars the hoops of barrels of different bilge and diameter may be readily cut.

A single knife may be used to sever the hoops; but I use a series of knives to form the notches, which are preferably undercut.

I claim as my invention—

1. The process herein described of notching hoops, said process consisting, first, in placing the hoop-blanks to be cut in line upon a table; second, arranging the angle of the notching-knife bar to the bilge of the barrel, and, third, cutting the notches in the series of hoops simultaneously, substantially as set forth.

2. The process herein described of notching and cutting hoops, said process consisting in, first, arranging the hoops for one end of a barrel upon the cutting-table; second, arranging the notching and cutting knives at the proper angle for the bilge of the barrel, and, third, severing the hoops on said angle simultaneously, substantially as described.

In testimony whereof I have signed my name to this specification in the presence of two subscribing witnesses.

MARIA E. BEASLEY.

Witnesses:
JNO. E. PARKE,
JOS. H. KLEIN.